(12) United States Patent
Mullins

(10) Patent No.: US 10,976,703 B2
(45) Date of Patent: *Apr. 13, 2021

(54) DYNAMIC HOLOGRAPHY FOCUSED DEPTH PRINTING DEVICE

(71) Applicant: Dualitas Ltd, Buckinghamshire (GB)

(72) Inventor: Brian Mullins, Los Angeles, CA (US)

(73) Assignee: Dualitas Ltd, Buckinghamshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/739,113

(22) PCT Filed: Dec. 22, 2016

(86) PCT No.: PCT/GB2016/054041
§ 371 (c)(1),
(2) Date: Dec. 21, 2017

(87) PCT Pub. No.: WO2017/115077
PCT Pub. Date: Jul. 6, 2017

(65) Prior Publication Data
US 2020/0041957 A1    Feb. 6, 2020

Related U.S. Application Data

(60) Provisional application No. 62/273,027, filed on Dec. 30, 2015.

(51) Int. Cl.
*G03H 1/00* (2006.01)
*B29C 64/227* (2017.01)
(Continued)

(52) U.S. Cl.
CPC ......... *G03H 1/0005* (2013.01); *B29C 64/227* (2017.08); *B29C 64/273* (2017.08);
(Continued)

(58) Field of Classification Search
CPC .. G03H 1/0005; G03H 1/2294; G03H 1/0476; G03H 2001/0224;
(Continued)

(56) References Cited

U.S. PATENT DOCUMENTS

| 5,682,214 A | 10/1997 | Amako et al. |
| 6,008,914 A | 12/1999 | Sasagawa et al. |

(Continued)

FOREIGN PATENT DOCUMENTS

| GB | 2221353 A | 1/1990 |
| GB | 2496108 A | 5/2013 |

(Continued)

OTHER PUBLICATIONS

Laskin et al., "Beam shaping to improve holography techniques based on spatial light modulators", Proc. SPIE 8642, Emerging Liquid Crystal Technologies VIII, 864201 (Mar. 5, 2013); doi: 10.1117/12.2001399, pp. 1-8. (Year: 2013).*

(Continued)

*Primary Examiner* — Maurice L. McDowell, Jr.
(74) *Attorney, Agent, or Firm* — McDonnell Boehnen Hulbert & Berghoff LLP

(57) ABSTRACT

A printing device (106) includes a laser source and a LCOS-SLM (Liquid Crystal on Silicon Spatial Light Modulator). The printing device generates a laser control signal and a LCOS-SLM control signal. The laser source (110) generates a plurality of incident laser beams based on the laser control signal. The LCOS-SLM (112) receives the plurality of incident laser beams, modulates the plurality of incident laser beams based on the LCOS-SLM control signal to generate a plurality of holographic wavefronts (214,216) from the modulated plurality of incident laser beams. Each holographic wavefront forms at least one corresponding focal point. The printing device cures a surface layer or (Continued)

sub-surface layer (406) of a target material (206) at interference points of focal points of the plurality of holographic wavefronts. The cured surface layer of the target material forms a three-dimensional printed content.

20 Claims, 10 Drawing Sheets

(51) Int. Cl.
- *B29C 64/273* (2017.01)
- *G03H 1/04* (2006.01)
- *G03H 1/22* (2006.01)
- *B33Y 50/00* (2015.01)
- *G03H 1/02* (2006.01)

(52) U.S. Cl.
CPC ......... *G03H 1/0476* (2013.01); *G03H 1/2294* (2013.01); *B33Y 50/00* (2014.12); *G03H 2001/0224* (2013.01)

(58) Field of Classification Search
CPC ... G03H 2001/0094; G03H 2001/2292; G03H 2210/30; G03H 2225/32; G03H 2225/52; B29C 64/227; B29C 64/273; B29C 64/106; B29C 64/277; B33Y 50/00; B33Y 10/00
See application file for complete search history.

(56) References Cited

U.S. PATENT DOCUMENTS

| | | | |
|---|---|---|---|
| 6,819,469 B1* | 11/2004 | Koba | G03H 1/2294 359/290 |
| 8,324,529 B2 | 12/2012 | Matsumoto | |
| 8,848,267 B2 | 9/2014 | Kurashige | |
| 2003/0090752 A1 | 5/2003 | Rosenberger | |
| 2011/0254916 A1 | 10/2011 | Fan et al. | |
| 2013/0265622 A1 | 10/2013 | Christmas et al. | |
| 2014/0253987 A1 | 9/2014 | Christmas | |
| 2015/0022526 A1* | 1/2015 | Christmas | G03H 1/0808 345/428 |
| 2015/0309473 A1 | 10/2015 | Spadaccini | |
| 2016/0199935 A1 | 7/2016 | Chen | |
| 2017/0082855 A1 | 3/2017 | Christmas et al. | |
| 2017/0115627 A1 | 4/2017 | Christmas et al. | |
| 2017/0363869 A1 | 12/2017 | Christmas et al. | |
| 2018/0015672 A1 | 1/2018 | Shusteff | |
| 2018/0046138 A1 | 2/2018 | Christmas et al. | |
| 2018/0120768 A1 | 5/2018 | Christmas | |
| 2018/0188532 A1 | 7/2018 | Christmas et al. | |
| 2018/0188684 A1 | 7/2018 | Mullins | |
| 2019/0004476 A1 | 1/2019 | Mullins | |
| 2019/0041641 A1 | 2/2019 | Christmas et al. | |
| 2019/0064738 A1 | 2/2019 | Cole et al. | |

FOREIGN PATENT DOCUMENTS

| | | |
|---|---|---|
| GB | 2526275 A | 11/2015 |
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| JP | H06 305032 A | 11/1994 |
| WO | 2018078366 A1 | 5/2018 |
| WO | 2018100394 A1 | 6/2018 |
| WO | 2018100397 A1 | 6/2018 |

OTHER PUBLICATIONS

International Search Report and Written Opinion for PCT/GB2016/054041, dated Apr. 18, 2017.
Copending U.S. Appl. No. 16/067,383, filed Jun. 29, 2018.
Copending U.S. Appl. No. 15/739,116, filed Dec. 21, 2017.

* cited by examiner

US 10,976,703 B2

DYNAMIC HOLOGRAPHY FOCUSED DEPTH PRINTING DEVICE

This application is a national stage application under 35 U.S.C. § 371 of International Application No. PCT/GB2016/054041, filed Dec. 22, 2016, which claims priority to U.S. Provisional Patent Application No. 62/273,027, filed Dec. 30, 2015, the disclosures of which are explicitly incorporated by reference herein.

FIELD

The present disclosure relates to a device and method. More specifically, the present disclosure relates to a 3D printer and method of 3D printing. Yet more specifically, the present disclosure relates to a holographic 3D printer and a method of 3D printing using holographic projection. Some embodiments relate to a holographic projector for heating a 3D target surface and a method of heating a 3D target surface using holographic projection. Some embodiments relate to a holographic projector for curing a 3D target surface and a method of curing a 3D target surface using holographic projection.

BACKGROUND 3D printing refers to various processes used to synthesize a three-dimensional object. In 3D printing, successive layers of material are formed under computer control to create a three-dimensional physical object. These objects can be of almost any shape or geometry, and are produced from a 3D model or other electronic data source. Unfortunately, 3D printing can take a very long time because only one single layer can be printed at a time.

There is described herein apparatus, methods and systems for heating—or even curing—a target surface using a holographic projection system.

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

SUMMARY

Figure 1:
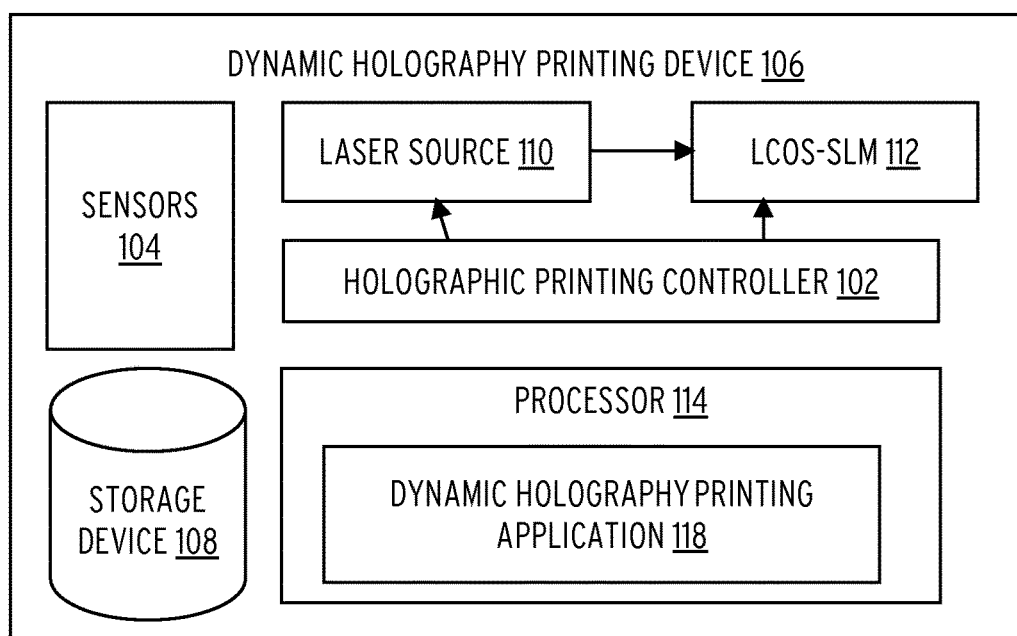
FIG. 1 a block diagram illustrating an example of a dynamic holography printing device in accordance with one example embodiment.

Example methods and systems are directed to a dynamic holography printing device. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Dynamic holographic wavefronts can be generated and manipulated such that the constructive and destructive interference of the laser lights can be controlled precisely and across a three-dimensional spatial area. With sufficient energy, these constructive and destructive interference points have enough energy to generate heat. The location and intensity of the heat can be controlled using the constructive and destructive interference at the laser wavefronts to focus and precisely generate heat/energy in a three-dimensional space to print a three-dimensional object using traditional 3D printing lithography/sintering techniques.

The dynamic holography technique for controlled depths provide a more controlled 3D-printing approaches by allowing more precise control over the spatial scanning of the printing "location". Therefore, instead of simply providing a scannable "point" within a three-dimensional space, or a full layer "mask," a fully 3D holographic "image" can be generated within a volume of curable material with sufficient power to cure the material within the volume at all holographic points, creating a full-3D print in the shape of the hologram with one pass.

The printer device uses a laser light that is diffracted (and, optionally reflected) through a holographic spatial light modulator (e.g. a LCOS-SLM (Liquid Crystal on Silicon Spatial Light Modulator) system). LCOS-SLM (Liquid Crystal on Silicon Spatial Light Modulator) is used to modulate the phase or amplitude of the laser light in order to generate a holographic wavefront (that is, a wavefront which reconstructs—e.g. on a surface—to form a holographic reconstruction or holographic image). The phase of the modulated light is controlled in such a manner that a complex holographic wavefront can be generated, optionally, with multiple focal points or just a single focal point. The phase of the modulated light may be controlled in such a manner to form a holographic image having any configuration. That is, the LCOS-SLM redistributes the receive optical energy in accordance with the LCOS-SLM control signal. As may be understood from the present disclosure, the receive optical energy may be focused to, for example, at least one focal point. Constructive and destructive interference from multiple holographic wavefronts occur at the focal points, leading to a concentration of energy from the laser light. The concentrated energy heats up or cures a material at the surface layer or a subsurface layer of a target material (e.g., heat sensitive paper). Because the focal points are generated by waveform reconstruction, the pattern and location of the focal points can be very precisely controlled to create complex patterns and shapes by modulating the phase and/or amplitude of the laser light. In some embodiments, the SLM is an LCOS-SLM. The LCOS-SLM thus allows a user to steer the holographic fields changing the location of the interference pattern.

In some embodiments, a device may include a hardware processor; a laser source configured to generate a group of incident laser beams based on the laser control signal; and/or a LCOS-SLM configured to receive the group of incident laser beams, to modulate the group of incident laser beams based on the LCOS-SLM control signal, to generate a group of holographic wavefronts, each holographic wavefront forming at least one corresponding focal point, to generate a group of distinct focused light field regions based on the interference points of the focal points of the group of holographic wavefronts, the group of distinct focused light field regions corresponding to a body of the three-dimensional object formed in a target material, and to cure a portion of the target material at the group of distinct focused light field regions.

There is provided a device comprising: a hardware processor comprising a dynamic holography printing application configured to generate a laser control signal and a LCOS-SLM (Liquid Crystal on Silicon Spatial Light Modulator) control signal based on a three-dimensional object; a laser source configured to generate a plurality of incident laser beams based on the laser control signal; and a LCOS-SLM configured to receive the plurality of incident laser beams, to modulate the plurality of incident laser beams based on the LCOS-SLM control signal, to generate a plurality of holographic wavefronts from the modulated plurality of incident laser beams, each holographic wavefront having corresponding focal points, to generate a plurality of distinct focused light field regions based on the interference points of the focal points of the plurality of holographic wavefronts, the plurality of distinct focused light field regions corresponding to a body of the three-dimensional object formed in a target material, and to cure a portion of the target material at the plurality of distinct focused light field regions, the portion of the target material including the body of the three-dimensional object.

In some embodiments, the hardware processor may include a dynamic holography printing application configured to generate a laser control signal and a LCOS-SLM (Liquid Crystal on Silicon Spatial Light Modulator) control signal based on a three-dimensional object. The portion of the target material may include the body of the three-dimensional object.

In some embodiments, such a device may further include a laser source controller coupled to the laser source. The laser source controller is configured to receive the laser control signal and to control the laser source in response to the laser control signal. A LCOS-SLM controller is coupled to the LCOS-SLM and configured to receive the LCOS-SLM control signal and to control the LCOS-SLM in response to the LCOS-SLM control signal.

In some embodiments, the LCOS-SLM is configured to focus laser light to at least one focal point. Curing may occur at the at least one focal point if the power density is sufficiently high. That is, in these embodiments, interference of plural focal points is not required to achieve the required power density for curing.

In some embodiments, the LCOS-SLM is configured to receive first laser light and second laser light. In some embodiments, the first laser light is received on a first plurality of pixels of the SLM and the second laser light is received on a second plurality of pixels of the SLM. In some embodiments, the first laser light and second laser light are received at the same time or substantially the same time. The first plurality of pixels are configured to focus the first laser light to at least one first focal point. The second plurality of pixels are configured to focus the second laser light to at least one second focal point. In some embodiments, the at least one first focal point and the at least one second focal point are substantially coincident. In these embodiments, constructive interference occurs at the focal points and curing of a target surface will occur if the power density is sufficiently high. It may be understood that the pixels of the SLM may be divided into any number of subsets, each subset arranged to receive respective laser light and focus that respective laser light to at least one focal point. In other embodiments, a plurality of SLMs may be used to bring a corresponding plurality of laser light beams to a common distinct focused light field regions to cure the target surface at the distinct focused light field regions.

In some embodiments, the at least some of the focal points are at different depths within the target material. That is, focal points are formed at different distances—namely, perpendicular distances—from the SLM. In some embodiments, this is achieved by using software lenses having different focusing powers, as described in more detail below. It may be understood that any defined 3D volume of the target may be irradiated—e.g. substantially at the same time—by combining any plurality of distinct focused light field regions using different software lenses and grating functions as part of the hologram—again, as detailed below.

In some embodiments, the dynamic holography printing application is configured to: identify a group of predefined spatial locations corresponding to the body of the three-dimensional object in the target material adjacent to the LCOS-SLM, and generate the LCOS-SLM control signal and the laser control signal to adjust a position of the focal points of the modulated group of incident laser beams to correspond with the group of predefined spatial locations. The LCOS-SLM causes the portion of the target material at the interference points formed based on the group of predefined spatial locations to cure.

In some embodiments, the dynamic holography printing application is configured to: identify a first group of predefined spatial locations corresponding to a first portion of the body of the three-dimensional object in the target material adjacent to the LCOS-SLM, adjust the laser control signal and the LCOS-SLM control signal based on the first group of predefined spatial locations, and form a second group of the focal points of the group of modulated laser light beams based on the first group of predefined spatial locations. The first portion of the body of the three-dimensional object is cured at the interference points based on the second group of focal points in the target material.

In some embodiments, the dynamic holography printing application is configured to: identify a second group of predefined spatial locations corresponding to a second portion of the body of the three-dimensional object in the target material, adjust the laser control signal and the LCOS-SLM control signal based on the second group of predefined spatial locations, form a third group of the focal points of the group of modulated laser light beams based on the second group of predefined spatial locations, and form another set of interference points based on the third group of focal points in addition to the interference points based on the second group of focal points. The second portion of the body of the three-dimensional object may be cured at the other set of interference points.

In some embodiments, the dynamic holography printing application is configured to: receive printing data corresponding to the three-dimensional object, identify regions within the target material based on the printed data, identify a second group of focal points corresponding to the regions within the target material based on the printed data, and adjust the laser control signal and the LCOS-SLM control signal based on the second group of focal points. The regions within the target material may be cured at the interference points based on the second group of focal points.

In some embodiments, the dynamic holography printing application is configured to: receive printing data corresponding to the three-dimensional object, compute a group of locations of interference points along a three-dimensional space based on the printed data, calculate a group of locations of focal points corresponding to the group of locations of interference points, generate the laser control signal and the LCOS-SLM control signal to form holographic wavefronts based on the location of the group of locations of focal points corresponding to the group of locations of interference points, heat the target material at the group of locations of the interference points of the holographic wavefronts, and form the three-dimensional object at the heated portion of the target material.

In some embodiments, the LCOS-SLM is configured to modulate at least a phase or an amplitude of the group of laser light beams to generate the group of holographic wavefronts at the focal points.

In some embodiments, such a device may further include a MEMS device configured to receive the group of incident laser beams from the laser source and/or a MEMS controller configured to generate a MEMS control signal to the MEMS device, the MEMS device reflecting the group of incident laser beams at a group of locations on the LCOS-SLM based on the MEMS control signal, the LCOS-SLM configured to receive the group of incident laser beams at the group of locations, to modulate the group of incident laser beams at the group of locations, and to generate a second group of holographic wavefronts from the modulated group of incident laser beams at the group of locations.

In some embodiments, each holographic wavefront forms at least one corresponding focal point. A portion of the target material is heated—and even cured—at interference points of focal points of the second group of holographic wavefronts.

In some embodiments, the modulated laser beams may include a combination of at least a spatially modulated phase-only light and a spatially modulated amplitude-only light.

In some embodiments, the LCOS-SLM is a reflective device. That is, the LCOS-SLM outputs spatially-modulated light in reflection. However, the present disclosure is equally applicable to a transmissive LCOS-SLM.

The term "hologram" is used to refer to the recording which contains amplitude and/or phase information about the object. The term "holographic reconstruction" is used to refer to the optical reconstruction of the object which is formed by illuminating the hologram. The term "replay field" is used to refer to the plane in space where the holographic reconstruction is formed. The terms "image" and "image region" refer to areas of the replay field illuminated by light forming the holographic reconstruction.

Reference is made herein to "holographic wavefronts" with respect to the wavefront of spatially-modulated light formed by the spatial light modulator. The wavefront is described as being holographic because it gives rise to a holographic reconstruction in the replay field. In some embodiments, the holographic wavefront gives rise to a holographic reconstruction through interference at the replay field. In some embodiments, the spatial light modulator applies a spatially-variant phase-delay to the wavefront. Each incident laser beam therefore gives rise to a corresponding holographic wavefront. In some embodiments, the LCOS-SLM is configured to receive a plurality of incident laser beams and output a respective plurality of holographic wavefronts.

Reference is also made herein to each holographic wavefront "forming focal points" with respect to formation of the holographic reconstruction at the replay field. The term "focal points" refers to the presence of concentrations of optical energy in the replay field. For example, each holographic wavefront may concentrate the light into a plurality of relatively small regions in the replay field. The term "focal" therefore merely reflects that the optical energy is concentrated. The term "points" therefore merely reflects that these areas of concentration may be plural and may be relatively small so as to achieve high energy density. For example, a received laser beam may be concentrated, or focused, by the spatial light modulator to a plurality of points in the replay field.

With respect to operation of the SLM, the terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

The term "light" is used herein in its broadest sense. Some embodiments are equally applicable to visible light, infrared light and ultraviolet light, and any combination thereof.

Some embodiments describe 1D and 2D holographic reconstructions by way of example only. In other embodiments, the holographic reconstruction is a 3D holographic reconstruction. That is, in some embodiments, each computer-generated hologram forms a 3D holographic reconstruction.

Some embodiments refer to a laser by way of example only and the present application is equally applicable to any light sources having sufficient optical energy to heat and cure a target material—e.g. a 3D printing precursor material—as described.

DETAILED DESCRIPTION OF DRAWINGS

It has been found that a holographic reconstruction of acceptable quality can be formed from a "hologram" containing only phase information related to the original object. Such a holographic recording may be referred to as a phase-only hologram. Some embodiments relate to phase-only holography by way of example only. That is, in some embodiments, the spatial light modulator applies only a phase-delay distribution to incident light. In some embodiments, the phase delay applied by each pixel is multi-level. That is, each pixel may be set at one of a discrete number of phase levels. The discrete number of phase levels may be selected from a much larger set of phase levels or "palette".

In some embodiments, the computer-generated hologram is a Fourier transform of the object for reconstruction. In these embodiments, it may be said that the hologram is a Fourier domain or frequency domain representation of the object. Some embodiments use a reflective SLM to display a phase-only Fourier hologram and produce a holographic reconstruction at a replay field, for example, a light receiving surface such as a screen or diffuser.

A light source, for example a laser or laser diode, is disposed to illuminate the SLM 140 via a collimating lens. The collimating lens causes a generally planar wavefront of light to be incident on the SLM. The direction of the wavefront is off-normal (e.g. two or three degrees away from being truly orthogonal to the plane of the transparent layer). In other embodiments, the generally planar wavefront is provided at normal incidence using a beam splitter, for example. In embodiments, the arrangement is such that light from the light source is reflected off a mirrored rear surface of the SLM and interacts with a phase-modulating layer to form an exit wavefront. The exit wavefront is applied to optics including a Fourier transform lens, having its focus at a screen.

The Fourier transform lens receives a beam of phase-modulated light from the SLM and performs a frequency-space transformation to produce a holographic reconstruction at the screen.

Light is incident across the phase-modulating layer (i.e. the array of phase modulating elements) of the SLM. Modulated light exiting the phase-modulating layer is distributed across the replay field. Notably, in this type of holography, each pixel of the hologram contributes to the whole reconstruction. That is, there is not a one-to-one correlation between specific points on the replay field and specific phase-modulating elements.

In these embodiments, the position of the holographic reconstruction in space is determined by the dioptric (focusing) power of the Fourier transform lens. In some embodiments, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. However, in other embodiments, the Fourier transform is performed computationally by including lensing data in the holographic data. That is, the hologram includes data representative of a lens as well as data representing the image. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, It is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the hologram is simply a software lens. That is, the software lens is not combined with other holographic data such as holographic data representative of an object. In some embodiments, the hologram includes a software lens and software grating arranged to determine the spatial location of light focused by the software lens. It may be understood that the hologram can produce any desired light field. In some embodiments, a plurality of holographically-formed light fields are interfered—for example, constructively interfered—to form distinct focused light field regions. It should therefore be understood that because the spatial light modulator is dynamically reconfigurable with different holograms, the distinct focused light field regions are under software control. There is therefore provided a holographic system for controllably irradiating a target with at least one distinct focused light field region—e.g. a region of constructive interference having relatively high intensity—e.g. energy or power density.

A Fourier hologram of a desired 2D image may be calculated in a number of ways, including using algorithms such as the Gerchberg-Saxton algorithm. The Gerchberg- Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only Fourier transform of the object may be calculated.

In some embodiments, a computer-generated hologram is calculated from amplitude information using the Gerchberg-Saxton algorithm or a variation thereof. The Gerchberg Saxton algorithm considers the phase retrieval problem when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral) domain. The spatial and spectral constraints are $I_A(x, y)$ and $I_B(x, y)$ respectively. The constraints in either the spatial or spectral domain are imposed upon the amplitude of the data set. The corresponding phase information is retrieved through a series of iterations.

In some embodiments, the hologram is calculated using an algorithm based on the Gerchberg-Saxton algorithm such as described in British patent 2,498,170 or 2,501,112 which are hereby incorporated in their entirety by reference.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

However, some embodiments relate to Fourier holography and Gerchberg-Saxton type algorithms by way of example only. The present disclosure is equally applicable to Fresnel holography and holograms calculated by other techniques such as those based on point cloud methods.

The present disclosure may be implemented using any one of a number of different types of SLM. The SLM may output spatially modulated light in reflection or transmission. In some embodiments, the SLM is a liquid crystal on silicon LCOS-SLM but the present disclosure is not restricted to this type of SLM.

FIG. 1 is a block diagram illustrating an example of a dynamic holography printing device in accordance with one example embodiment. A dynamic holography printing device 106 includes a laser source 110, an LCOS-SLM 112, a holographic printing controller 102, a processor 114, sensors 104, and a storage device 108.

The laser source 110 generates a laser beam(s) (e.g., for example at least 1 W). The laser source 110 directs the laser beam(s) towards the LCOS-SLM 112. The LCOS-SLM 112 modulates the incident laser beam (e.g., laser light from the laser source 110) based on signal data from the processor 114 to generated reflected light (e.g., modulated laser light). The modulated laser light from the LCOS-SLM 112 forms holographic wavefronts. Heat is formed at the constructive interference points of the holographic wavefronts. The heat can be shaped, manipulated, steered by adjusting the modulation of the incident laser beams, the number of incident laser beams, and the intensity and direction of the laser beams. The heat can be used to cure specific three-dimensional regions in a target material for three-dimensional printing. That is, the shape of the heated area is controlled by controlling the hologram (or holograms) represented on the spatial light modulator. In some embodiments, the spatial light modulator is configured to provide at least one phase-only lens to bring the received light to at least one corresponding focal point. In some embodiments, the spatial light modulator is configured to provide at least one phase-only lens and at least one corresponding grating to controllably-position the corresponding focused light.

The holographic printing controller 102 generates a laser control signal to the laser source 110 and an LCOS-SLM 112 control signal to the LCOS-SLM 112 based on the pattern identified by the processor 114.

The processor 114 includes a dynamic holography printing application 118 to control and steer regions of interference (e.g., heating regions). The dynamic holography printing application 118 identifies a printing pattern and location relative to a surface of the LCOS-SLM 112. The printing pattern and distance to the surface of the target material may be user-selected or determined based on data from sensors 104.

In one example embodiment, the dynamic holography printing application 118 identifies predefined spatial locations corresponding to the desired printing pattern (e.g., a three-dimensional object model) in a target material. The dynamic holography printing application 118 generates the LCOS-SLM control signal and the laser control signal to adjust a position of the focal points of the modulated plurality of incident laser beams to correspond with the predefined spatial locations. The LCOS-SLM 112 forms the heat/high intensity regions at the interference points based on the predefined spatial locations to form the 3D object in the target material by curing the corresponding areas.

In another example embodiment, the dynamic holography printing application 118 identifies a first set of predefined spatial locations adjacent to the LCOS-SLM 112 and adjusts the laser control signal and the LCOS-SLM control signal based on the first set spatial locations. The dynamic holography printing application 118 determines a set focal points of the set of modulated laser light beams based on the first set of predefined spatial locations. The LCOS-SLM 112 forms the distinct focused light field regions at the interference points based on the set of focal points of the set of modulated laser light beams.

In another example embodiment, the dynamic holography printing application 118 identifies another set of predefined spatial locations and adjusts the laser control signal and the LCOS-SLM control signal based on the other set of predefined spatial locations. The dynamic holography printing application 118 determines focal points of the modulated laser light beams based on the other set of predefined spatial locations. The LCOS-SLM 112 changes the location of the plasma from the interference points based on the set of focal points to the interference points based on the focal points of the modulated laser light beams based on the other set of predefined spatial locations.

In another example embodiment, the dynamic holography printing application 118 receives an identification of a spatial location and geometric printing pattern based on a three-dimensional content (e.g., a 3D model). The dynamic holography printing application 118 identifies a set of focal points corresponding to the identification of the spatial location and geometric printing pattern. The dynamic holography printing application 118 adjusts the laser control signal and the LCOS-SLM control signal based on the set of focal points. Heat is formed at the interference points based on the set of focal points. In some embodiments, plasma is formed at the interference points based on the second set of focal points. In these embodiments, the plasma is responsible for the localised heating.

In another example embodiment, the dynamic holography printing application 118 receives an identification of a spatial location and geometric pattern of the plasma and identifies a set of interference points corresponding to the identification of the spatial location and geometric printing pattern. The dynamic holography printing application 118 identifies a second set of focal points based on the set of interference points and adjusts the laser control signal and the LCOS-SLM control signal based on the second plurality of focal points. Plasma may be formed at the interference points based on the second set of focal points.

In another example embodiment, the processor 114 retrieves from the storage device 108 content associated with a physical object detected by sensors 104. In one example embodiment, the dynamic holography printing application 118 identifies a particular physical object (e.g., a ball) and generates a location and printing pattern (e.g., a 3D model of the ball).

The sensors 104 include, for example, a thermometer, an infrared camera, a barometer, a humidity sensor, an EEG sensor, a proximity or location sensor (e.g, near field communication, GPS, Bluetooth, Wifi), an optical sensor (e.g., camera), an orientation sensor (e.g., gyroscope), an audio sensor (e.g., a microphone), or any suitable combination thereof. It is noted that the sensors described herein are for illustration purposes and the sensors 104 are thus not limited to the ones described.

The storage device 108 stores an identification of the sensors and their respective functions. The storage device 108 further includes a database of visual references (e.g., images, visual identifiers, features of images) and corresponding plasma geometric shape and patterns (e.g., sphere, beam, cube).

In one embodiment, the dynamic holography printing device 106 may communicate over a computer network with a server to retrieve a portion of a database of visual references. The computer network may be any network that enables communication between or among machines, databases, and devices (e.g., the dynamic holography printing device 106). Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 2:
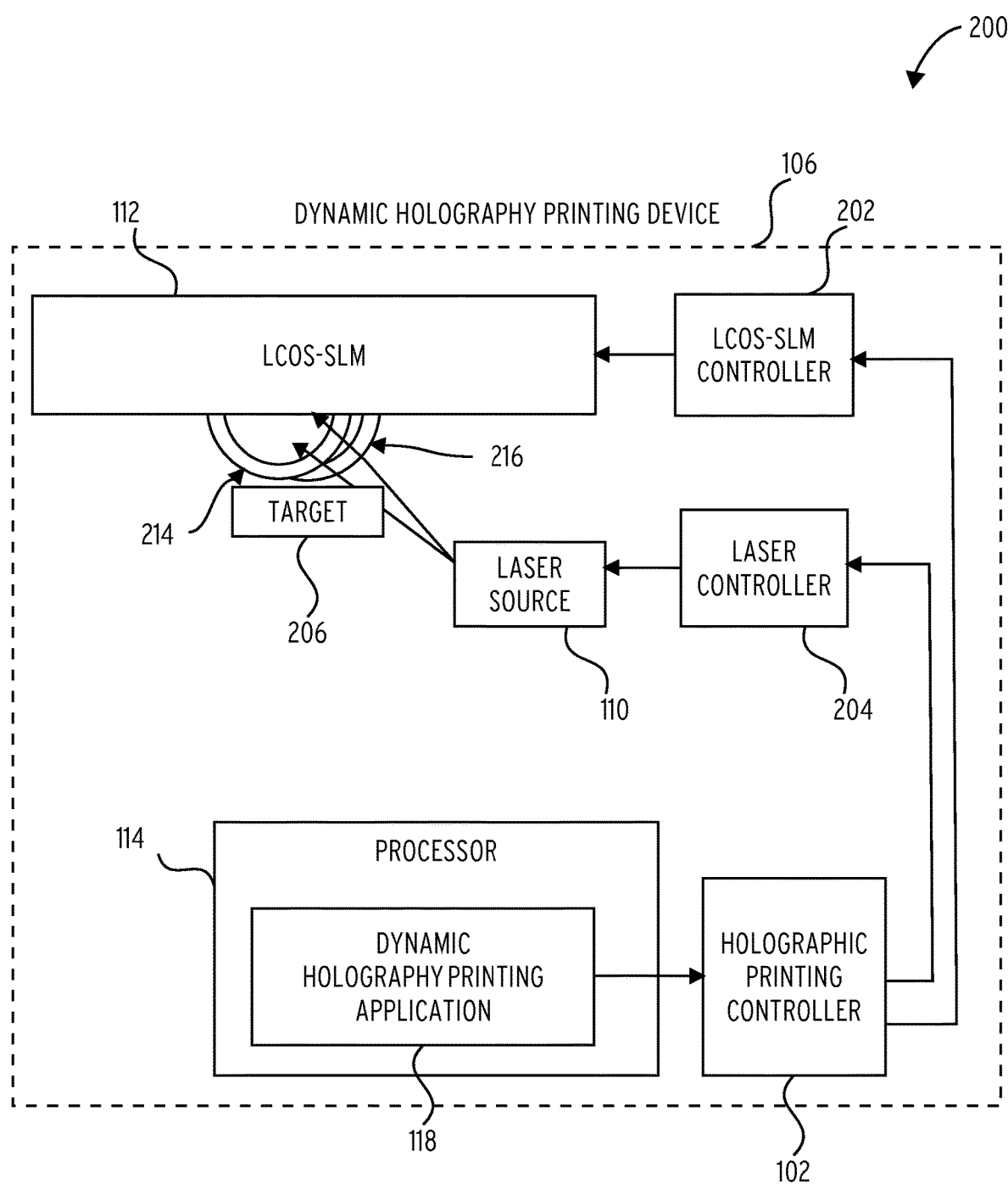
FIG. 2 a block diagram illustrating another example of a dynamic holography printing device in accordance with one example embodiment.

FIG. 2 is a block diagram illustrating another example of a dynamic holography printing device in accordance with one example embodiment. The dynamic holography printing device 106 includes the LCOS-SLM 112, an LCOS-SLM controller 202, the laser source 110, a laser controller 204, a holographic printing controller 102, and the processor 114 including the dynamic holography printing application 118.

The dynamic holography printing application 118 identifies a heat (or printing) pattern and computes the location and patterns of the interference points of holographic waves to form the heat pattern. The dynamic holography printing application 118 communicates the location and patterns of the interference points to the holographic printing controller 102. In another example embodiment, the dynamic holography printing application 118 computes the locations and patterns of the interference points and generate a laser control signal and a LCOS-SLM control signal to the holographic printing controller 102 based on the computed locations and patterns of the interference points.

The holographic printing controller 102 sends the laser control signal to the laser controller 204. The holographic printing controller 102 also sends the LCOS-SLM control signal to the holographic printing controller 102. The laser controller 204 generates and communicates the laser control signal to control an intensity, a number of beams, and a beam direction of the laser source 110. The LCOS-SLM controller 202 generates and communicates the LCOS-SLM control signal to direct the LCOS-SLM 112 to modulate the laser light from the laser source 110 such that the wavefront interference generates energy (e.g., heat).

FIG. 2 illustrates the laser source 110 that produces a first incident laser beam and a second incident laser beam directed at the LCOS-SLM 112. The LCOS-SLM 112 generates the first incident laser beam into a first set of holographic light field 214 (e.g., a first holographic wavefront) and the second incident laser beam into a second holographic wavefront second set of holographic light field 216 (e.g., a second holographic wavefront). The constructive interference between the first set of holographic light field 214 and the second set of holographic light field 216 forms heat. The shape and location of the heat can be controlled and steered by adjusting the control signals to the laser controller 204 and the LCOS-SLM controller 202.

Figure 3:
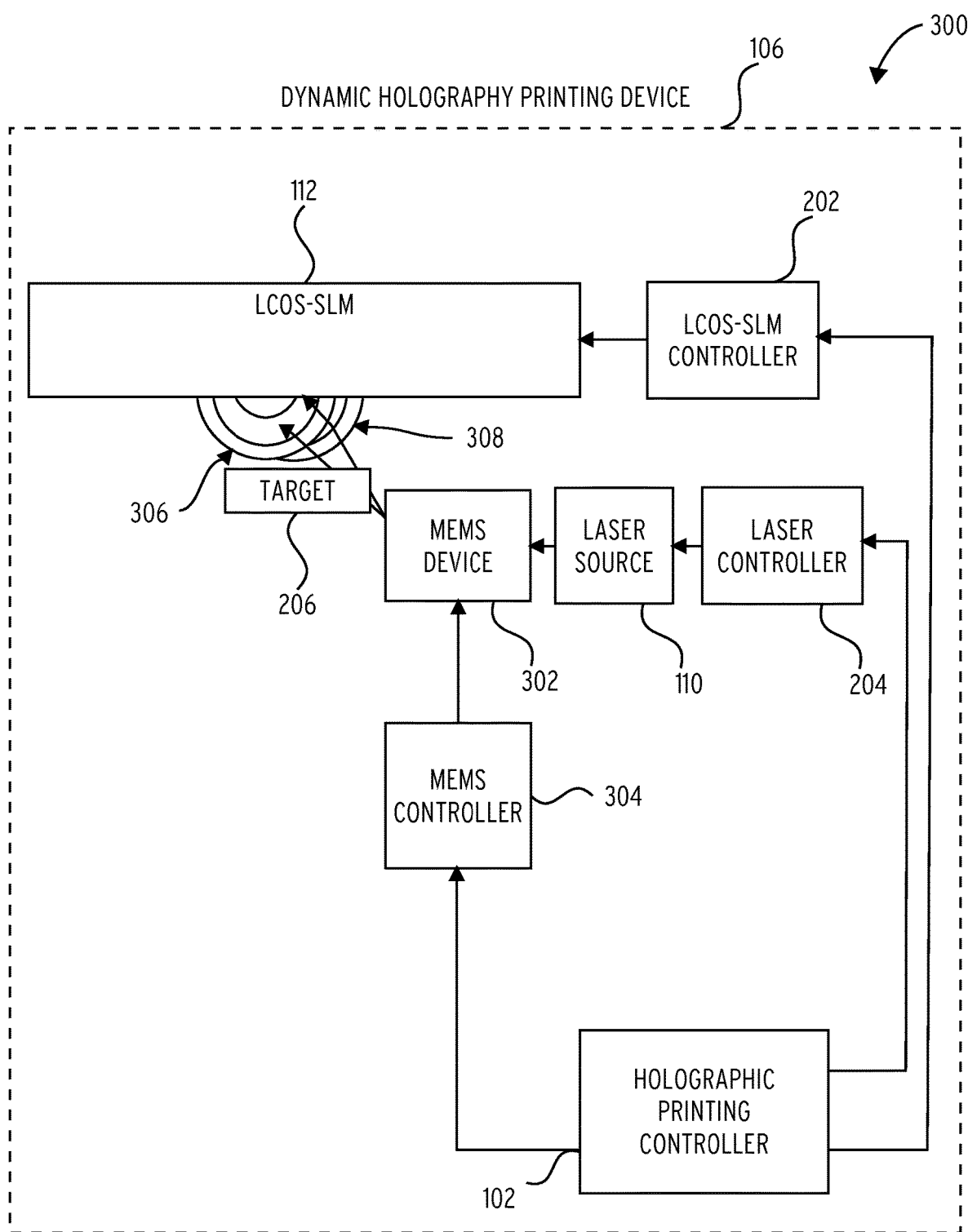
FIG. 3 a block diagram illustrating an example of a dynamic holography printing device in accordance with another example embodiment.

FIG. 3 is a block diagram illustrating an example of a dynamic holography printing device in accordance with another example embodiment. The dynamic holography printing device 106 includes the LCOS-SLM 112, the LCOS-SLM controller 202, the laser source 110, the laser controller 204, a MEMS device 302, a MEMS controller 304, and a laser controller 204.

The dynamic holography printing application 118 identifies a pattern and computes the location and patterns of the interference points of holographic waves to form a three-dimensional heat pattern. The dynamic holography printing application 118 communicates the location and patterns of the interference points to the holographic printing controller 102.

The holographic printing controller 102 sends the laser control signal to the laser controller 204. The holographic printing controller 102 also sends the LCOS-SLM control signal to the holographic printing controller 102. In one example embodiment, the holographic printing controller 102 sends a MEMS control signal to the MEMS controller 304.

The MEMS controller 304 communicates the MEMS control signal to the MEMS device 302 to control a direction of a laser beam from the laser source 110. In one example embodiment, the MEMS controller 304 generates a synchronization signal to both the laser source 110 and the MEMS device 302. The synchronization signal enables the MEMS device 302 to operate and reflect corresponding individual light beams from the laser source 110.

The MEMS device 302 receives one or more laser beam from the laser source 110 and reflects corresponding individual light beams to the LCOS-SLM 112. The MEMS device 302 reflects the light beams based on the synchronization signal from the MEMS controller 304 or holographic printing controller 102 to guide the corresponding individual light beams to the corresponding locations on the LCOS-SLM 112. The MEMS device 302 includes, for example, one or more mirrors. The position and orientation of the mirrors is controlled and adjusted based on the synchronization signal received from the MEMS controller 304.

Figure 4:
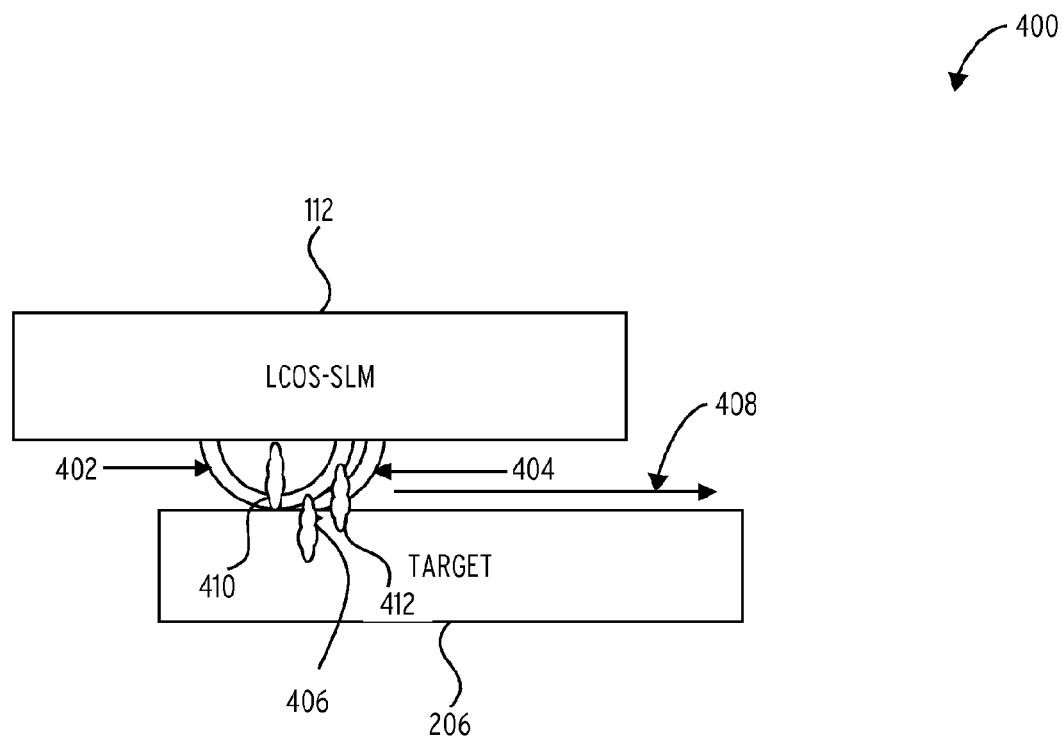
FIG. 4 a block diagram illustrating an example of a printing operation using a dynamic holography printing device in accordance with one example embodiment.

FIG. 4 is a block diagram illustrating an example of a printing operation using a dynamic holography printing device in accordance with one example embodiment. The dynamic holography printing application 118 identifies a three-dimensional heat pattern and computes the location and patterns of the interference points of holographic waves to form the three-dimensional heat pattern. The dynamic holography printing application 118 communicates the location and patterns of the interference points to the holographic printing controller 102.

FIG. 4 illustrates the laser source 110 that produces a first incident laser beam and a second incident laser beam directed at the LCOS-SLM 112. The LCOS-SLM 112 modulates the first incident laser beam into a first set of holographic light field 402 (e.g., a first holographic wavefront) and the second incident laser beam into a second set of holographic light field 404 (e.g., a second holographic wavefront). The constructive/destructive interference 406 between the first set of holographic light field 402 and the second set of holographic light field 404 forms heat. The shape and location of the interference 406 can be controlled and steered by adjusting the control signals to the laser controller 204 and the LCOS-SLM controller 202.

The dynamic holography printing device 106 can tune the holographic light fields to spatially move. For example, the target 206 includes curable or sinterable material that solidifies at the interference 406. The cure direction 408 indicates that the wavefronts can be adjusted such that the location of curing/sintering can be adjusted to allow for solidification at multiple points.

In another example embodiment, multiple areas of interferences (406, 410, 412) may be formed simultaneously by generating multiple sets of holographic light fields. The multiple areas of interferences form three-dimensional spatial region corresponding to a printed 3D object. In some embodiments, each holographic light field is formed by a respective hologram on a SLM (or common SLM). In some embodiments, each hologram includes holographic data providing a lensing function and/or a grating function such that the size, shape and position of each holographic light field is precisely controlled. In some embodiments, holographic light fields are interfered—e.g. constructively interfered—to achieve light intensities required for at least one of heating, curing and 3D printing.

Figure 5:
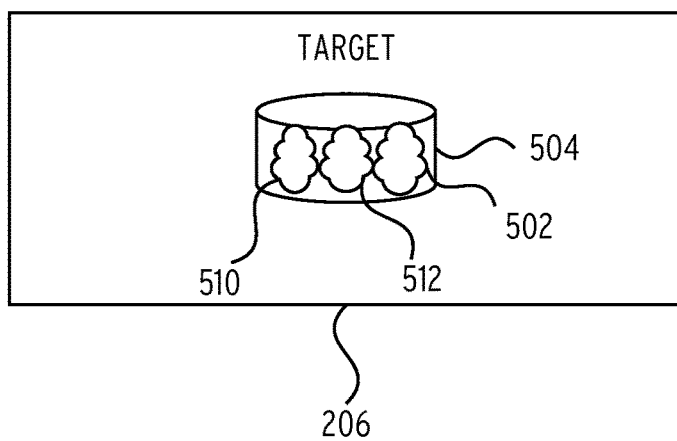
FIG. 5 a block diagram illustrating an example of three-dimensional printed object in accordance with one example embodiment.

FIG. 5 is a block diagram illustrating an example of three-dimensional printed object in accordance with one example embodiment. The dynamic holography printing application 118 generates multiples regions holographic light fields (510, 512, 502) using the techniques previously described with respect to FIG. 4. The combined regions 510, 512, 502 form the cured three-dimensional object 504 within the material in the target 206. Again, holographic light fields may be produced at different depths within the target material by selecting the dioptric power of the corresponding software lens.

Figure 6:
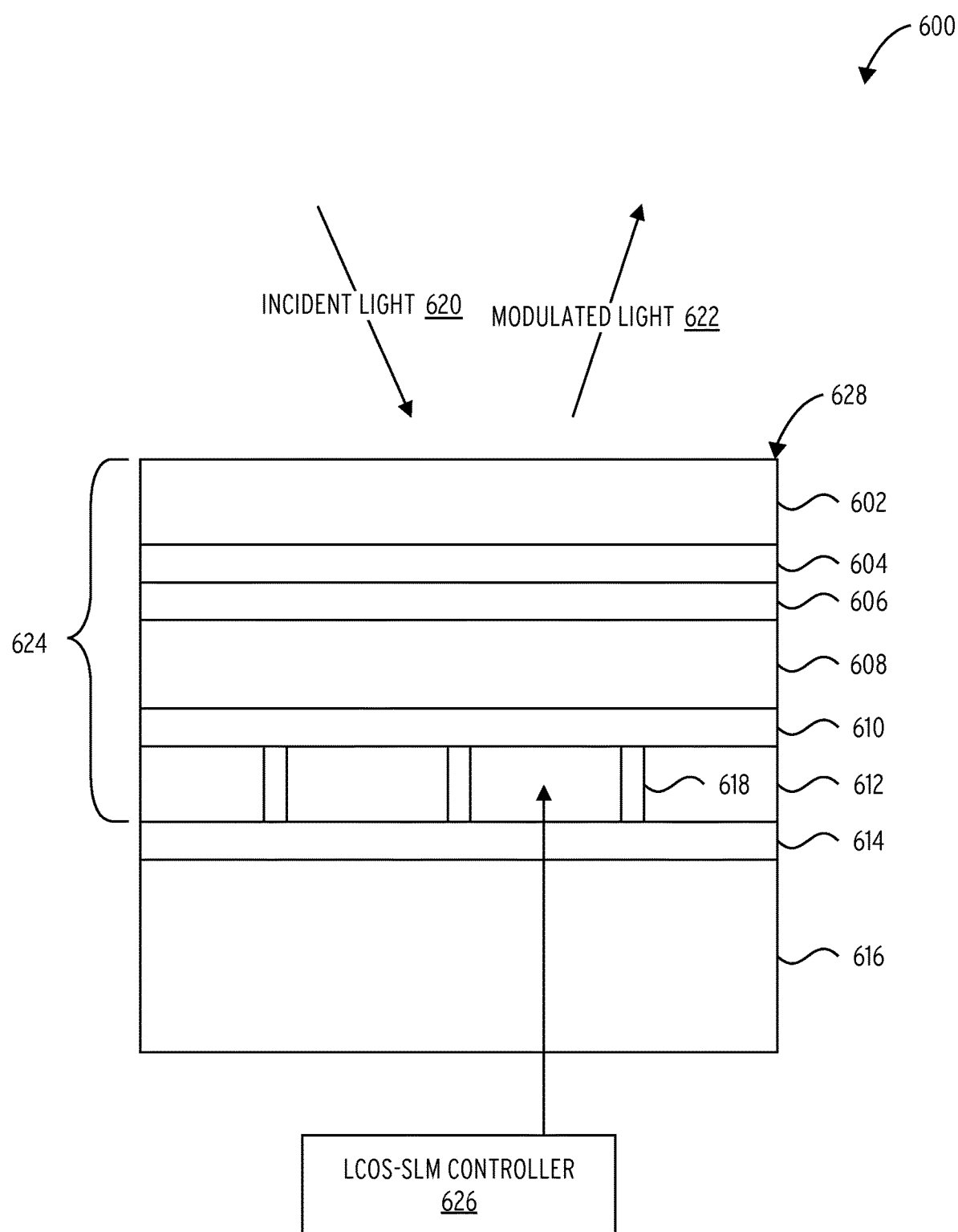
FIG. 6 is a diagram illustrating a cross-section of an example of a LCOS-SLM (Liquid Crystal on Silicon Spatial Light Modulator).

FIG. 6 is a diagram illustrating a cross-section of an example of a LCOS-SLM (Liquid Crystal on Silicon Spatial Light Modulator). An LCOS-SLM 628 is formed using a single crystal silicon substrate 616. The substrate 616 consists of a two-dimensional array of square planar aluminium electrodes 612, spaced apart by a gap 618, arranged on the upper surface of the substrate 616. The electrodes 612 are connected to the substrate 616 via a circuit 614 buried in the substrate 616. Each electrode 612 forms a respective planar mirror. The electrodes 612 may be connected to the LCOS-SLM controller 626. In other words, the electrodes 612 receives control signal from the LCOS-SLM controller 626.

An alignment layer 610 is disposed on top of the two-dimensional array of electrodes 612, and a liquid crystal layer 608 is disposed on the alignment layer 610.

A second alignment layer 606 is disposed on top of the liquid crystal layer 608. A planar transparent layer 602 (e.g. made of glass) is disposed on the top of the second alignment layer 606. A single transparent electrode 604 is disposed between the planar transparent layer 602 and the second alignment layer 606.

Each of the square electrodes 612 defines, together with the overlying region of the transparent electrode 604 and the intervening liquid crystal layer 608, a controllable phase-modulating element 624 (also referred to as a pixel). The effective pixel area, or fill factor, is the percentage of the total pixel which is optically active, taking into account the space or gap 618 between pixels. By controlling the voltage applied to each electrode 612 with respect to the transparent electrode 604, the properties of the liquid crystal material (in the liquid crystal layer 608) of the respective phase modulating element may be varied. The variation of the phase modulating element provides a variable delay to incident light 620. The effect is to provide phase-only modulation to the wavefront (i.e. no amplitude effect occurs in the resulting modulated light 622).

One advantage of using a reflective LCOS spatial light modulator is that the liquid crystal layer can be half the thickness than would be necessary if a transmissive device were used. This greatly improves the switching speed of the liquid crystal (a key point for projection of moving video images). Another advantage is that a LCOS device is also capable of displaying large arrays of phase only elements in a small aperture. Small elements (typically approximately 10 microns or smaller) result in a practical diffraction angle (a few degrees) so that the optical system does not require a very long optical path.

It is easier to adequately illuminate the small aperture (a few square centimeters) of the LCOS-SLM 628 than it would be for the aperture of a larger liquid crystal device. LCOS SLMs also have a large aperture ratio, there being very little dead space between the pixels (because the circuitry to drive them is buried under the mirrors). The small aperture results in lowering the optical noise in the replay field.

Another advantage of using a silicon backplane (e.g., silicon substrate 616) has the advantage that the pixels are optically flat, which is important for a phase modulating device.

While embodiments relate to a reflective LCOS SLM, those of ordinary skilled in the art will recognize that other types of SLMs can be used including transmissive SLMs.

Figure 7:
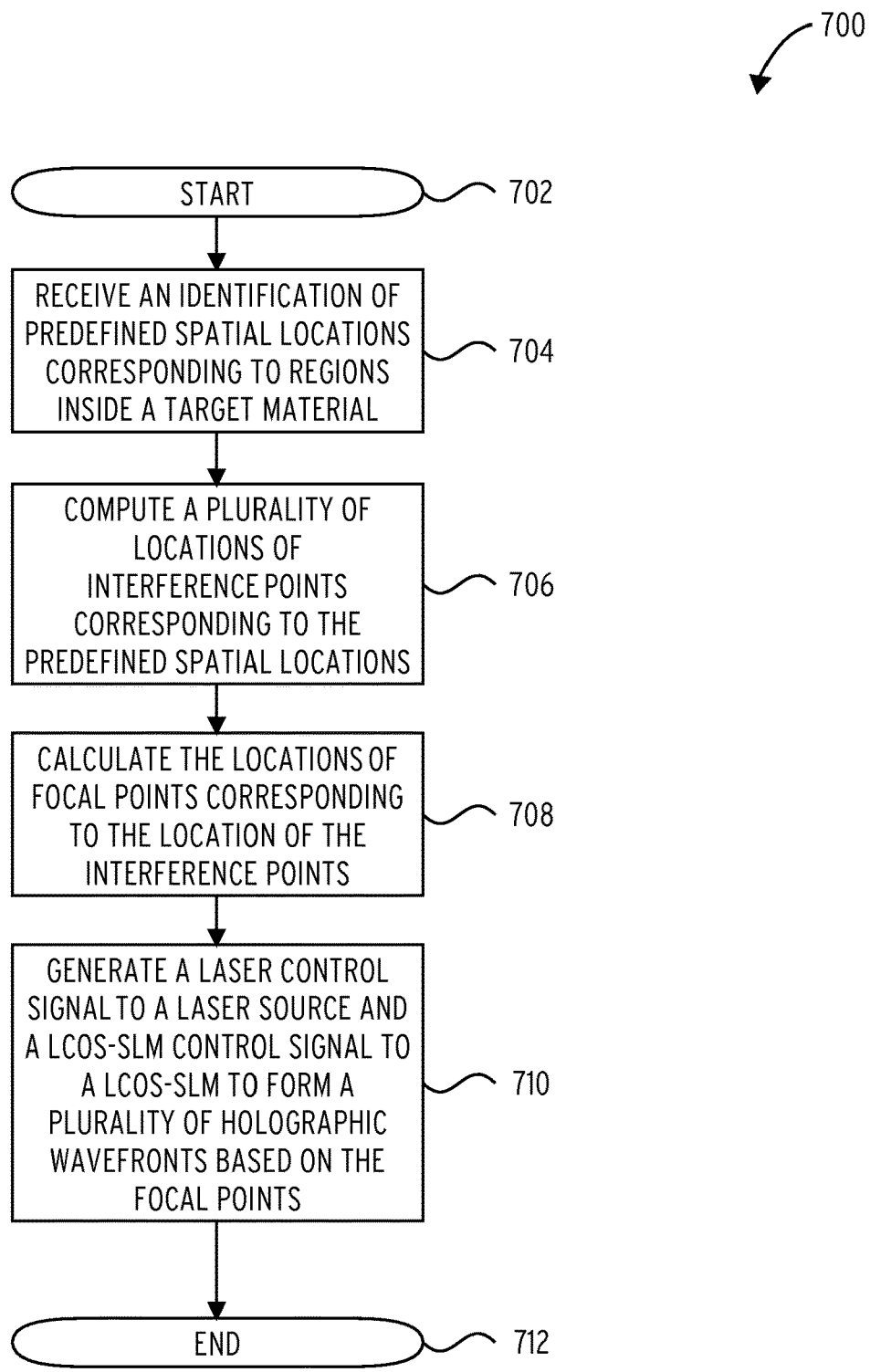
FIG. 7 is a flow diagram illustrating one example operation of a dynamic holography printing device, in accordance with an example embodiment.

FIG. 7 is a flow diagram illustrating another example operation of a dynamic holography printing device, in accordance with an example embodiment. At block 704, the dynamic holography printing application 118 receives an identification of predefined spatial locations (e.g., desired locations inside a target material). At block 706, the dynamic holography printing application 118 computes the location of interference points of holographic wavefronts (to be generated by the LCOS-SLM 112) corresponding to the predefined spatial locations. At block 708, the dynamic holography printing application 118 calculates the location of focal points corresponding to the location of interference points of the holographic wavefronts. At block 710, the dynamic holography printing application 118 generates a laser control signal to the laser source 110 and a LCOS-SLM control signal to the LCOS-SLM 112 to form the holographic wavefronts based on the location of focal points.

Figure 8:
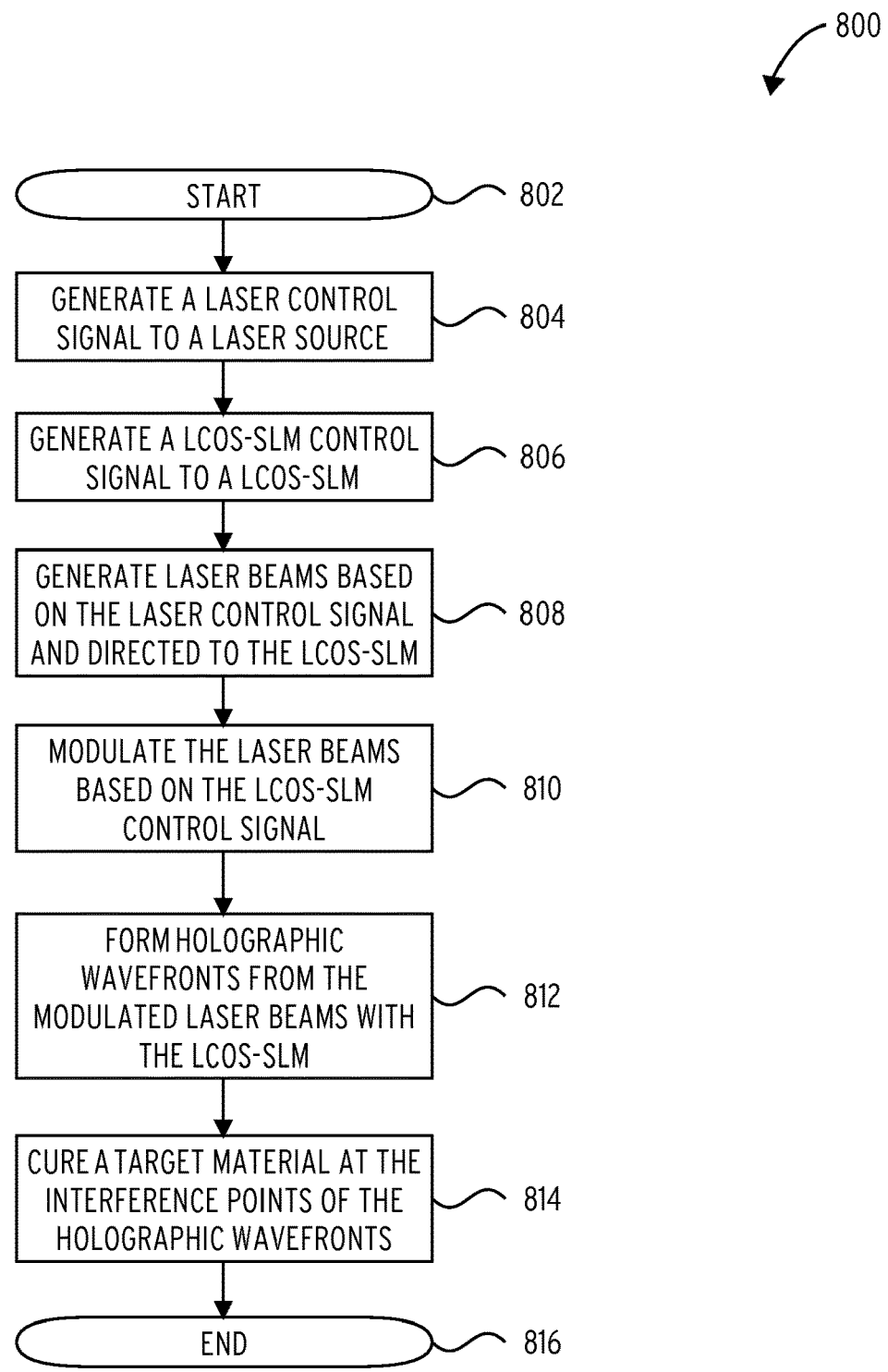
FIG. 8 is a flow diagram illustrating another example operation of a dynamic holography printing device, in accordance with an example embodiment.

FIG. 8 is a flow diagram illustrating another example operation of a dynamic holography printing device, in accordance with an example embodiment. At block 804, the laser controller 204 generates a laser control signal to the laser source 110 to control an intensity of a laser beam, a direction of a laser beam, and a number of laser beams. At block 806, the LCOS-SLM controller 202 generates a LCOS-SLM control signal to the LCOS-SLM 112 to control a modulation of incident light beams directed on the LCOS-SLM 112. At block 810, the LCOS-SLM 112 modulates the incident laser beams from the laser source 110. At block 812, the LCOS-SLM 112 forms holographic wavefronts from the modulated laser beams. At block 814, heat is formed at the location of interference points of the holographic wavefronts and the heat cures the target material at the corresponding heat locations.

Figure 9:
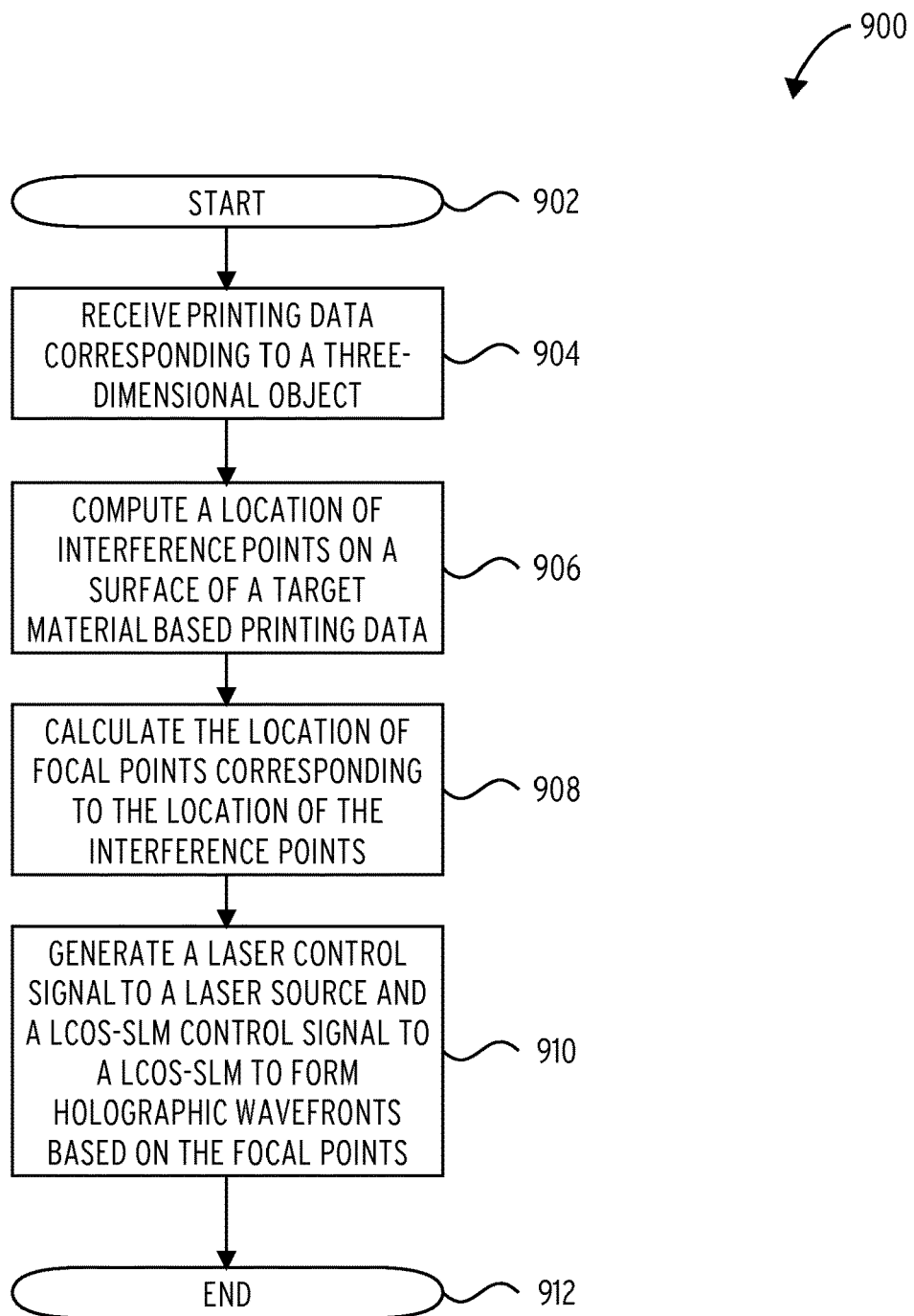
FIG. 9 is a flow diagram illustrating another example operation of a dynamic holography printing device, in accordance with an example embodiment.

FIG. 9 is a flow diagram illustrating another example operation of a dynamic holography printing device, in accordance with an example embodiment. At block 904, the dynamic holography printing application 118 receives printing data corresponding to a three-dimensional object. At block 906, the dynamic holography printing application 118 computes a location of the interference points inside the target material based on the printing data. At block 908, the dynamic holography printing application 118 calculates the location of focal points corresponding to the location of the interference points. At block 910, the dynamic holography printing application 118 generates a laser control signal to the laser source 110 and a LCOS-SLM control signal to an LCOS-SLM 112 to form holographic wavefronts based on the focal points.

Figure 10:
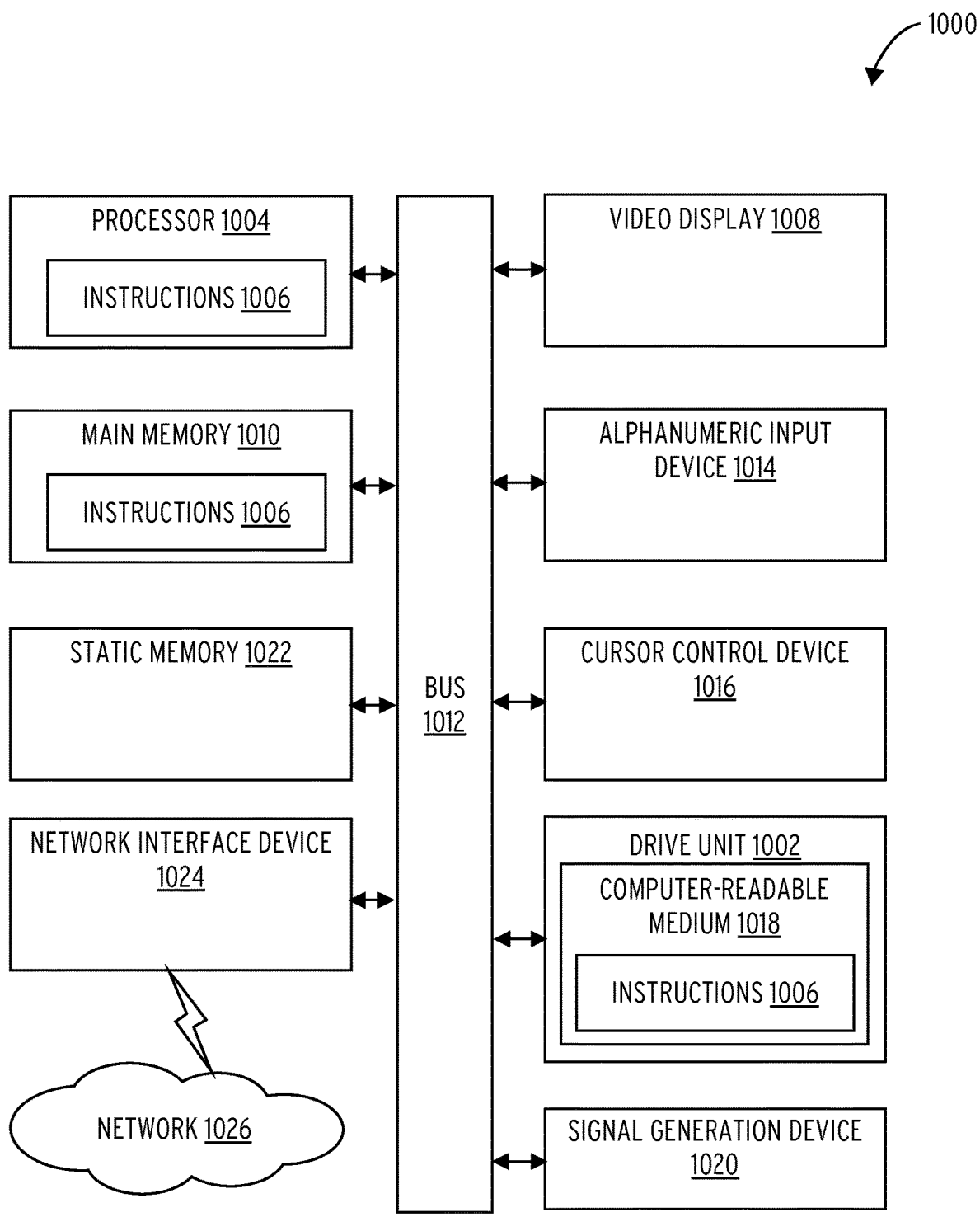
FIG. 10 a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1006 from a computer-readable medium 1018 (e.g., a non-transitory machine-readable medium, a machine-readable storage medium, a computer-readable storage medium, or any suitable combination thereof) and perform any one or more of the methodologies discussed herein, in whole or in part. Specifically, the machine 1000 in the example form of a computer system (e.g., a computer) within which the instructions 1006 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1006, sequentially or otherwise, that specify actions to be taken by that machine. Further, while only a single machine is illustrated, the term "machine" shall also be taken to include any collection of machines that individually or jointly execute the instructions 1006 to perform all or part of any one or more of the methodologies discussed herein.

The machine 1000 includes a processor 1004 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1010, and a static memory 1022, which are configured to communicate with each other via a bus 1012. The processor 1004 contains solid-state digital microcircuits (e.g., electronic, optical, or both) that are configurable, temporarily or permanently, by some or all of the instructions 1006 such that the processor 1004 is configurable to perform any one or more of the methodologies described herein, in whole or in part. For example, a set of one or more microcircuits of the processor 1004 may be configurable to execute one or more modules (e.g., software modules) described herein. In some example embodiments, the processor 1004 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1004, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a video display 1008 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1014 (e.g., a keyboard or keypad), a cursor control device 1016 (e.g., a mouse, a touchpad, a trackball, a joystick, a motion sensor, an eye tracking device, or other pointing instrument), a drive unit 1002, a signal generation device 1020 (e.g., a sound card, an amplifier, a speaker, a headphone jack, or any suitable combination thereof), and a network interface device 1024.

The drive unit 1002 (e.g., a data storage device) includes the computer-readable medium 1018 (e.g., a tangible and non-transitory machine-readable storage medium) on which are stored the instructions 1006 embodying any one or more of the methodologies or functions described herein. The instructions 1006 may also reside, completely or at least partially, within the main memory 1010, within the processor 1004 (e.g., within the processor's cache memory), or both, before or during execution thereof by the machine 1000. Accordingly, the main memory 1010 and the processor 1004 may be considered machine-readable media (e.g., tangible and non-transitory machine-readable media). The instructions 1006 may be transmitted or received over a computer network via the network interface device 1024.

For example, the network interface device 1024 may communicate the instructions 1006 using any one or more transfer protocols (e.g., hypertext transfer protocol (HTTP)).

In some example embodiments, the machine 1000 may be a portable computing device (e.g., a smart phone, tablet computer, or a wearable device), and have one or more additional input components (e.g., sensors or gauges). Examples of such input components include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the computer-readable medium 1018 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1006 for execution by the machine 1000, such that the instructions 1006, when executed by one or more processors of the machine 1000 (e.g., processor 1004), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1006 for execution by the machine 1000 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1006).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hard-wired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A device comprising:
  a hardware processor comprising a dynamic holography printing application configured to generate a laser control signal and a LCOS-SLM (Liquid Crystal on Silicon Spatial Light Modulator) control signal based on a three-dimensional object;
  a laser source configured to generate one or more incident laser beams based on the laser control signal; and
  a LCOS-SLM configured to receive the one or more incident laser beams, to modulate the one or more incident laser beams based on the LCOS-SLM control signal, to generate one or more holographic wavefronts, each holographic wavefront forming a light field region comprising at least one focal point, the plurality of light field regions corresponding to a body of the three-dimensional object formed in a target material, and to cure a portion of a target material at the plurality of light field regions, the portion of the target material including the body of the three-dimensional object.

2. The device of claim 1, further comprising:
  a laser source controller coupled to the laser source, the laser source controller configured to receive the laser control signal and to control the laser source in response to the laser control signal; and
  a LCOS-SLM controller coupled to the LCOS-SLM, the LCOS-SLM controller configured to receive the LCOS-SLM control signal and to control the LCOS-SLM in response to the LCOS-SLM control signal.

3. The device of claim 1, wherein the dynamic holography printing application is configured to:
  identify a plurality of predefined spatial locations corresponding to the body of the three-dimensional object in the target material adjacent to the LCOS-SLM; and
  generate the LCOS-SLM control signal and the laser control signal to adjust a position of the focal points of the modulated one or more incident laser beams to correspond with the plurality of predefined spatial locations, the LCOS-SLM curing the portion of the target material at the plurality of predefined spatial locations.

4. The device of claim 1, wherein the dynamic holography printing application is configured to:
  receive printing data corresponding to the three-dimensional object;
  identify regions within the target material based on the printed data;

identify a plurality of focal points corresponding to the regions within the target material based on the printed data; and adjust the laser control signal and the LCOS-SLM control signal based on the plurality of focal points, the regions within the target material cured at the plurality of focal points.

5. The device of claim 1, wherein the LCOS-SLM is configured to modulate the phase of the incident laser beams to generate the plurality of holographic wavefronts.

6. The device of claim 1, further comprising:
a MEMS device configured to receive the one or more incident laser beams from the laser source; and
a MEMS controller configured to generate a MEMS control signal for the MEMS device, the control signal being configured to cause the MEMS device reflect the one or more incident laser beams at a plurality of locations on the LCOS-SLM based on the MEMS control signal.

7. The device of claim 1, wherein the one or more modulated laser beams are modulated with a phase-only modulation.

8. The device of claim 1, wherein the hardware processor is configured to provide the LCOS-SLM control signal in real time by calculation of a hologram based on image data based on the three-dimensional object, and wherein the LCOS-SLM is configured to display the hologram, the hologram being configured to modulate the one or more incident laser beams to form the plurality of light field regions as a holographic reconstruction of the hologram.

9. The device of claim 1, further comprising a physical lens configured to receive modulated light from the LCOS-SLM, the device being configured such that positions of the focal points of the one or more holographic wavefronts are determined using a hybrid lens arrangement, wherein the hybrid lens arrangement comprises lensing data representative of a lens addressed on the LCOS-SLM and the physical lens, and wherein the hybrid lens arrangement performs a Fourier transform.

10. A method comprising:
generating a laser control signal and a LCOS-SLM control signal based on a three-dimensional object;
generating one or more incident laser beams based on the laser control signal with a laser source;
modulating the one or more incident laser beams based on the LCOS-SLM control signal with a LCOS-SLM to generate one or more holographic wavefronts from the one or more modulated incident laser beams, each holographic wavefront forming a light field region comprising at least one corresponding focal point,
wherein the plurality of light field regions correspond to a body of the three-dimensional object formed in a target material; and
curing a portion of the target material at the plurality of light field regions, the portion of the target material including the body of the three-dimensional object.

11. The method of claim 10, further comprising:
identifying a plurality of predefined spatial locations corresponding to the body of the three-dimensional object in the target material adjacent to the LCOS-SLM;

generating the LCOS-SLM control signal and the laser control signal to adjust a position of the focal points of the modulated one or more incident laser beams to correspond with the plurality of predefined spatial locations; and curing the portion of the target material at the plurality of predefined spatial locations with the LCOS-SLM.

12. The method of claim 10, further comprising:
receiving printing data corresponding to the three-dimensional object;
identifying regions within the target material based on the printed data;
identifying a plurality of focal points corresponding to the regions within the target material based on the printed data; and
adjusting the laser control signal and the LCOS-SLM control signal based on the plurality of focal points, the regions within the target material cured at the plurality of focal points.

13. The method of claim 10, further comprising:
modulating at least a phase or an amplitude of the one or more incident laser beams to generate the one or more holographic wavefronts.

14. The method of claim 10, further comprising:
generating a MEMS control signal for a MEMS device, the MEMS device reflecting the one or more incident laser beams at a plurality of locations on the LCOS-SLM based on the MEMS control signal, the LCOS-SLM configured to receive the one or more incident laser beams at the plurality of locations.

15. The method of claim 10, wherein the one or more modulated laser beams are modulated with a phase-only modulation.

16. The method of claim 15, wherein a frequency-space transform is performed on the one or more holographic wavefronts using one or more lenses to provide the plurality of light field regions as a holographic reconstruction.

17. The method of claim 15, wherein the one or more lenses includes a physical lens.

18. The method of claim 17, wherein the one or more lenses includes a software lens.

19. The method of claim 10, wherein the LCOS-SLM control signal is provided in real time by calculation of a hologram based on image data based on the three-dimensional object, the LCOS-SLM control signal causing the LCOS-SLM to display the hologram, the hologram modulating the one or more incident laser beams, the plurality of light field regions being formed by a holographic reconstruction of the hologram.

20. The method of claim 10, wherein positions of the focal points of the one or more holographic wavefronts are determined using a hybrid lens arrangement, wherein the hybrid lens arrangement comprises lensing data representative of a lens addressed on the LCOS-SLM and a physical lens, and wherein the hybrid lens arrangement performs a Fourier transform.

* * * * *